{United States Patent Office}

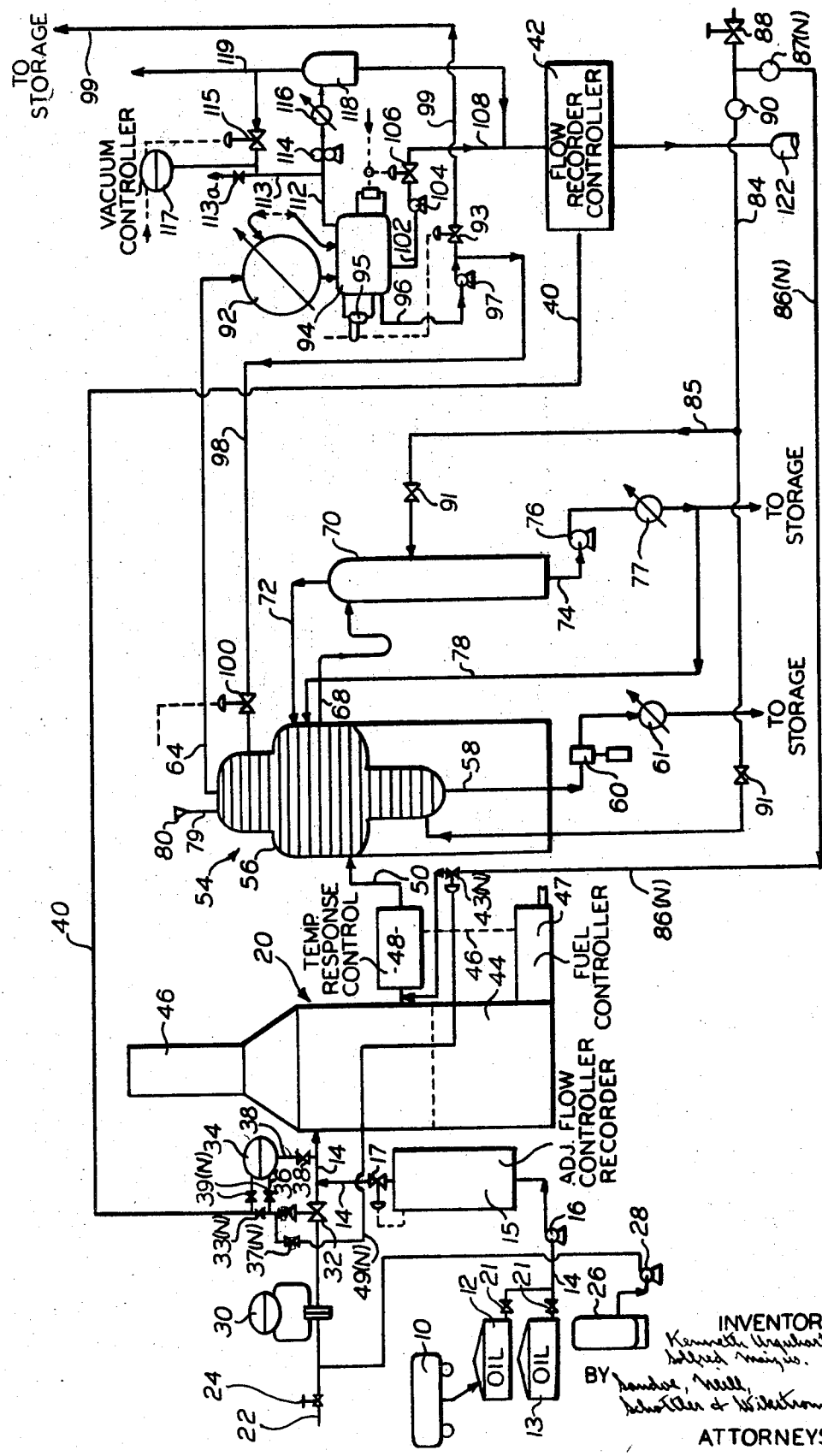

3,565,791
Patented Feb. 23, 1971

3,565,791
METHOD AND APPARATUS FOR DISTILLING OIL AND WATER MIXTURES
Kenneth Urquhart, 52 S. 2nd Ave., Mount Vernon, N.Y. 10550, and Solfred Maizus, 302 Ashland Place, Brooklyn, N.Y. 11217
Filed Dec. 12, 1968, Ser. No. 783,185
Int. Cl. C10g 33/00
U.S. Cl. 208—187
8 Claims

ABSTRACT OF THE DISCLOSURE

Water is separated from high boiling point oils (or other immiscible liquids) with simultaneous fractionation of the oil by supplying the mixture of water and oil to a fractionator at predetermined ratios, and using the steam generated from this water as part of the steam for flashing. A flow recorder for water at the outlet end of the system measures the outflow and controls the supply of make-up water to maintain a substantially constant water-oil ratio.

BACKGROUND AND SUMMARY OF THE INVENTION

In oil refining systems, and especially in systems for re-refining used crank case oil containing dispersants and other additives, preliminary "dehydrators" have been used to flash off the water which is contained in the oil. The dispersants tend to hold water in the oil. The steam obtained could not be effectively used in the system because of the variation in the amount of water in different batches of oil.

Instead of dehydrating the oil, this invention adds additional water to the oil as necessary to maintain a substantially constant percentage of water in the oil and water mixture supplied to a fractionator. The oil and water mixture is supplied to the fractionator after heating, and the controlled supply of steam generated is used as "flashing" steam to reduce the partial pressure at the flash zone of the fractionator. Stripping steam can be supplied from another source as needed.

The amount of water added to the oil, and the amount of stripping steam, are easily determined. They are, therefore, known quantities in the operation of the refining system. The amount of water trapped in the original oil, as by the dispersants, is the unknown quantity. In order to maintain the constant water-oil ratio of this invention, the steam from the fractionating apparatus is condensed and measured. This water minus the amount added to the oil and the amount added as steam to the fractionator and stripper is the amount that was originally trapped in the oil. The system is controlled by adding water or steam to the oil as required to provide a specified total amount of water in the oil going to an oil-heating furnace as determined from the condensate. Automatic controls are provided responsive to the condensate measurement.

This invention will be described as applied to a refining system for used crank case oil, but it will be understood that the invention has other uses.

BRIEF DESCRIPTION OF THE DRAWING

The drawing is a diagram of an oil refining system made and operated according to this invention.

DESCRIPTION OF PREFERRED EMBODIMENT

Oil to be refined is delivered by a truck 10, or other supply means, to oil storage tanks 12 and 13. The oil from the storage tanks 12 and 13 is fed selectively through a supply line 14, by pump 16, to a heater furnace 20. Valves 21 are used to shut off either of the tanks 12 or 13 from the line 14 when the other tank is in use.

The oil flow from the storage tank 12 or 13 into the heater 20 is maintained at a predetermined steady flow, which may be manually set as desired by adjusting a flow control instrument 15 which operates a flow control valve 17. The usual refining practice of filling and mixing each feed tank in turn and setting a constant feed rate from each feed tank provides for adequate control over fractionating tower product steam specifications. Some manual setting of oil feed and total water rates to the heater feed is performed in swinging from one feed tank to another to obtain optimum operation. This setting procedure can be adapted to be performed by a computer, but the computer operation is not economic for smaller operations. If desired steam may be supplied to the system from steam supply line 22 through block valve 24, or instead, water may be supplied from a feed water tank 26 delivered by pumps 28 to line 14 and the heater 20. The amount of water or steam flowing to the heater 20 is measured and recorded by a recording flow meter 30; and the rate of flow of water to the heater 20 is determined by a pressure responsive control valve 32 which is operated by an actuator 34, or in other ways to be described.

The actuator 34 supplies pressure, to operate the valve 32, through a fluid pressure line 36 and can be connected by other means if desired. The actuator 34 communicates through piping 38 with the supply line which supplies water and oil to the heater 20; and the actuator 34 is responsive to pressure in this supply line 14. The other side of the actuator 34 is connected by a communicating piping 40 to a condensate flow recorder controller 42 which measures the amount of condensed steam from a condenser 92. If desired, the actuator 34 can be cut out of the circuit by valves 39 and the valve 32 can be operated directly by pressure signals from the controller 42 through the pipe 40 for determining the amount of water to be supplied to the mixture to maintain the substantially constant percentage of water in the oil supplied to the system. For a given rate of flow of steam through the stripper steam supply line 84, the controller 42 can be calibrated to serve as an automatic controller responsive to the difference in the amount of water condensed from the fractionater and the amount of water supplied as steam through the stripper steam supply line. The valve 32 can also be operated manually in accordance with information from the flow recorder 42. The control provided by the connection 38 makes the response of the valve 32 sensitive to sudden changes in pressure in the heater 20 resulting from sudden substantial changes in the amount of water in the oil as when mixing of batches in the tanks 12 and 13 is poor.

The actuator 34 operates automatically in response to signals from the flow recorder controller 42 to open and close the valve 32 by varying amounts depending upon the magnitude of the signal through the communicating pipe 40, and the connection through the piping 38 permits the actuator 34 to compensate promptly for quick pressure variations in the supply line 14 that follow any furnace outlet temperature variations.

Occasionally the water content of feed tank may produce a pressure loss through heater 20 so great as to limit the flow through heater 20. When this happens, steam or water injection into feed entering the heater 20 is stopped. Superheated steam is injected into feed leaving the heater 20 through piping 50. Block valve 24 in steam supply line 22 is closed. Water pump 28 is stopped. Superheated steam from line 84 is passed through line 86N, flow meter 87N, control valve 43N into piping 50. The temperature of this superheated steam is maintained at the temperature of the feed from heater 20 passing through line 50 into the fractionating station 54. The quantity injected, as for the previously described usual operation, is that required to maintain the desired pre-set oil and water percentage mix. Thus, flashing steam is supplied to the oil and water mixture selectively before the mixture is heated or after the mixture is heated, depending upon the pressure drop of the mixture through the heater 20.

The actuator 34 supplies pressure through line 49N and valve 37N to operate valve 43N to supply the required superheated steam. Valve 33N in fluid pressure line 36 is shut. Valve 37N in fluid pressure line 49N is open.

As previously described, the other side of actuator 34 is connected by communicating piping to flow recorder controller 42 and can be cut out of the circuit by valves 39 and operated directly by pressure signals from controller 42.

Flow control valves 32 and 43N are constructed and adjustable to produce the required flow response pattern to fluid pressure received through fluid pressure lines 40 and 49N respectively to maintain the desired oil and water percentage mix, regardless of whether water, or steam, as the case may be, is injected into feed entering or leaving the heater 20.

The heater 20 includes a furnace 44 at its lower end and products of combustion pass through heat exchange means and out through a stack 46. The particular kind of heat exchange means forms no part of the present invention, and any apparatus for transferring heat from the products of combustion of the furnace 44 to the oil and water or steam supplied through the supply line 14 can be used. The temperature to which the oil is raised in the heater 20 is controlled by a fuel controller 47 actuated by a temperature responsive control 48 on the oil outlet line from the heater. The heating capacity of the heater 20 is correlated with the rate of supply of the oil and water mixture so as to change the water into steam.

In the heater 20, the mixture of oil and water is preferably raised to and maintained at a temperature between 720 and 750° F. and is then discharged through piping 50 to a fractionating station 54. The fractionating station 54 includes a fractionating tower 56 and the piping 50 enters the fractionating tower 56 at a point midway between the upper and lower ends of the tower 56. Four outlets from the tower 56 are provided. There is an outlet 58 at the bottom of the tower 56 from which the heavy residues or "bottoms" are withdrawn by a pump 60; the material then passing to a cooler 61 and then to storage.

Another outlet line 64 at the upper end of the tower 56 is provided for the discharge of some low boiling temperature oil vapor, and for all steam from within the tower. At a midpoint on the tower 56 there is an outlet line 68 for oil of intermediate boiling point such as the oil used for diesel fuel. This oil is fractionated in the tower 56 and flows through the outlet line 68 to a stripper 70 which is part of the fractionating station 54. Light ends remaining in the liquid which passes to the stripper are fed back as vapor to the tower 56 through a stripper outlet line 72, and the heavier oil is withdrawn from the stripper 70 through an outlet line 74 by a pump 76. Beyond the pump 76 the oil passes through a cooler 77 and a part of the oil is returned through a reflux piping connection 78 to the upper end of the tower 56. The fourth outlet from the tower 56 is a vent line 79 on which there is a pressure relief valve 80.

Stripping steam is supplied through a steam line 84 from a boiler and superheater (not shown); and this stripping steam line 84 connects with the tower 56 and also connects with the stripper 70 through a branch steam line 85. The pressure of steam supplied through the steam line 84 is regulated by a valve 88, and this supply of steam is an addition to the steam which is generated by heating of the mixed oil and water originally introduced into the system through the supply line 14. The rate of flow is indicated by a flow meter 90, and is controlled by throttling valves 91 which with the valve 88 are merely representative of means for controlling the rate of flow.

The outlet line 64 leads to a condenser 92 in which the low boiling point oil is condensed and discharged into a tank 94. Some of this oil is withdrawn through pipe 96 and is pumped by a pump 97 through piping 98 back to the tower 56 to control the temperature of the top portion of the tower. A temperature control valve 100 in the piping 98 regulates the rate of flow of oil back to the tower 56 through the piping 98.

Oil can also be withdrawn from the tank 94 through line 96 and pump 97, line 99 and level control valve 93 actuated by level controller 95 connected to tank 94 and controlling the oil level therein. The light oil product from level control valve 93 goes through line 99 to storage.

The water condensate settling in tank 94 is drawn off the bottom of tank 94 through suction piping 102 to pump 104 and is discharged through piping 108, a control valve 108, a control valve 106 and the orifice flow recorder controller 42 to an oil water separator 122.

Piping 113 off piping 112 is provided with a block valve 113a to the atmosphere and a connection to a vacuum control valve 115 actuated by a vacuum recorder controller 117 which is also connected to piping 113. Controller 117 actuates the vacuum control valve 115 to permit the required vapor from line 119 to enter the suction line 112 to the vacuum pump 114 to maintain a set vacuum on the fractionating station 54.

Steam mixed with some oil vapor is pumped from the tank 94 through piping 112 by a vacuum pump 114 to a condenser 116 where the steam is condensed and the water discharged into an accumulator tank 118. The water from the tank 118, containing inconsequential amounts of light oil, flows from the tank 118 and the water is injected into line 108. The non-condensable vapor from accumulator tank 118 passes through line 119 to a burning system.

The system is preferably operated with the fractionating station under vacuum of approximately 3 inches of mercury and at a temperature of approximately 650° F. In the condenser 92, the temperature is reduced to about 90–100° F. In the condenser 116 the steam is no longer under vacuum and it condenses readily since it is cooled below its boiling point.

Thus all of the water either as water or steam, that enters the apparatus at the fractionating station 54, including the steam supplied to the stripper 70, eventually passes through the flow recorder controller 42. If the amount of water reaching the flow recorder controller 42 decreases while the supply of steam through meters 30, and 90 or 87N and water or steam through supply line 14, remains constant, this indicates a decrease in the amount of water in the oil from the supply tanks. The reduced water in the supply oil is compensated by increasing the water from the tank 26 or the water or steam from the supply line 22. Conversely, any increase in the rate of water supplied to the flow recorder controller 42 is compensated by decreasing the water or steam added to the oil supplied to the heater 20. Compensation for changes in the amount of water in the oil supply from the tanks 12 and 13 can also be made in accordance with the difference between the rate of discharge of water (steam) from the fractionating zone to the rate of flow of stripper steam to the fractionating zone.

When changes are made in the steam flow through the meter 90, the flow recorder controller 42, or the actuator 34, or both, are adjusted in accordance with the new rate of flow so as to still detect a change in the amount of water in the oil from the tanks 12 and 13.

The preferred embodiment of the invention has been illustrated and described, and the invention is defined in the appended claims.

What is claimed is:

1. In the continuous fractionating of oil, the supply of which contains variable quantities of water, the method which comprises flashing the oil at a fractionating station with water added to the oil for flashing steam, introducing additional stripping steam at the lower end of the fractionating station, withdrawing products continuously from the fractionating station, condensing the water from the fractionating station including that which was in the oil supply, and adding water to the new oil being supplied to the fractionating station in accordance with the water condensed from the products that flow from the fractionating station which is in excess of the total amount of water supplied for the flashing steam and the stripping steam and thereby counteracting variations of water in the oil supply.

2. The method described in claim 1 characterized by at least a part of the water in the supply oil being held in the mixture by the presence of dispersants in the oil, and heating the oil sufficiently to change that water into steam before passing the oil into the fractionating station.

3. The method described in claim 1 characterized by supplying additional water to the oil as steam, and controlling the amount of water so added to the oil in accordance with the difference between the rate of flow of water from the fractionating zone and the rate of flow of stripper steam to the fractionating zone.

4. The method described in claim 3 characterized by heating the oil and water mixture on its way to the fractionating station, measuring the temperature of the mixture as it comes from the heater, automatically controlling the operation of the heater in response to variations in the temperature of the mixture coming from the heater to compensate any decrease in temperature of the mixture, supplying flashing steam to the mixture selectively before the mixture is heated or after the mixture is heated, depending upon the pressure drop of the mixture through the heater.

5. In the supplying of oil containing varying amounts of water to a flashing zone of a fractionating station, the method which comprises passing the oil and water mixture through a heater on its way to the flashing zone, measuring the temperature of the mixture as it comes from the heater, and compensating for temperature variations of the mixture as it comes from the heater, by adding flashing steam to the mixture, and varying the amount of flashing steam automatically in response to variations in said temperature of the mixture to maintain an approximately constant percentage of flashing steam in the flashing zone of the fractionating station.

6. Apparatus for separating water from oil in an oil reclaiming system including, in combination, a supply line through which oil mixed with some water flows into the system, means for introducing additional water into the mixture, said means including a movable device adjustable to maintain a substantially constant percentage of water in the mixture, fractionating apparatus to which the mixture is supplied, a condenser for the steam from the fractionating apparatus, and means for measuring the amount of water from the condenser for determining the required amount of adjustment of said device to maintain the substantially constant percentage of water in the oil supplied to the system.

7. The apparatus described in claim 6 characterized by a heater through which the mixture of water and oil passes on its way to the fractionating apparatus, the heating capacity of said heater being correlated with the rate of supply of the oil and water mixture to change the water into steam, the fractionating apparatus being a fractionator for separating light and heavy constituents of the oil and including a stripper, a line for supplying stripping steam to the fractionator, and an automatic controller for operating the means for introducing controlled quantities of additional water into the mixture, said automatic controller being responsive to the difference in the amount of water condensed from the fractionator and the amount of water supplied as steam through the stripper steam supply line.

8. The apparatus described in claim 7 characterized by the heater being a furnace in which the mixture is heated to a temperature of approximately 720–750° F., and the fractionator having a vacuum fractionating chamber with means for heating the oil to approximately 650° F., and with means for maintaining a vacuum of approximately 3 inches of mercury.

References Cited
UNITED STATES PATENTS

| | | | |
|---|---|---|---|
| 1,676,609 | 7/1928 | Hunneman | 208—356 |
| 2,057,004 | 10/1936 | Burkhard | 208—356 |
| 2,366,899 | 1/1945 | Hall et al. | 208—187 |
| 2,919,239 | 12/1959 | Ludwig | 208—187 |
| 3,151,055 | 9/1964 | Muller | 208—187 |
| 3,210,271 | 10/1965 | Byerly et al. | 208—356 |

HERBERT LEVINE, Primary Examiner

U.S. Cl. X.R.

208—185, 188, 356; 196—46, 132